2,598,848

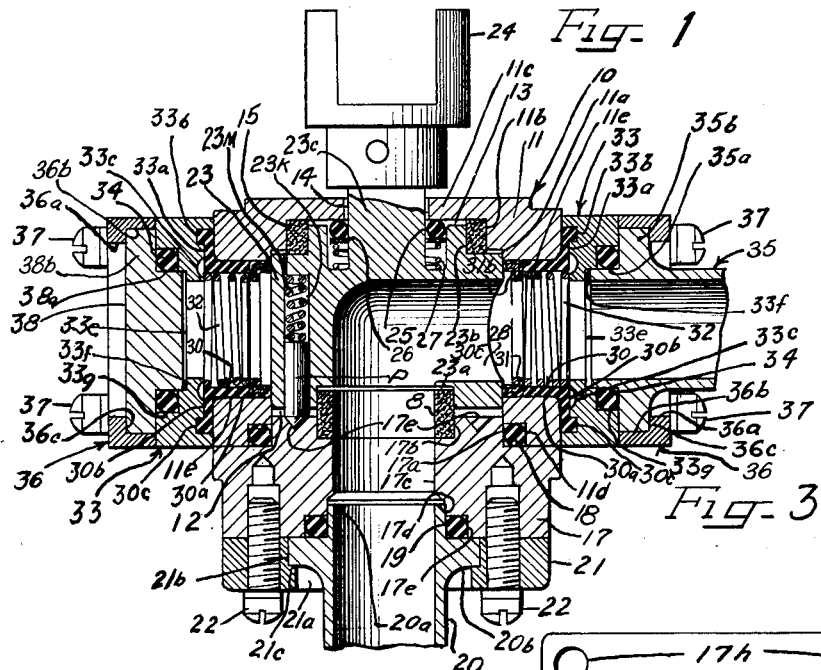
June 3, 1952  J. R. SNYDER ET AL  2,598,848
VALVE STRUCTURE
Filed Feb. 23, 1946
Inventors
JACOB RUSH SNYDER
JAMES FREDERICK NORTON Patented June 3, 1952

UNITED STATES PATENT OFFICE 2,598,848

VALVE STRUCTURE

Jacob Rush Snyder, Cleveland, and James Frederick Norton, Cleveland Heights, Ohio, assignors to Thompson Products, Inc., Cleveland, Ohio, a corporation of Ohio Application February 23, 1946, Serial No. 649,544

1 Claim. (Cl. 251—113)

This invention relates to a fluid flow control device such as a selector valve, and particularly to a valve construction embodying improved bearing means for rotatably supporting the valve plug and detent positioning means cooperating with the valve plug to maintain the valve plug in a desired axial position relative to its bearings and to position the valve plug in any selected one of a plurality of rotative positions.

In our copending application Serial No. 624,242, filed October 24, 1945, of which the present application is a division, there is disclosed and claimed a combination seal and swivel mounting especially useful in fluid control devices, such as plug type selector valves or the like.

A feature of the present invention is the arrangement of the rotatable valve plug with respect to an apertured cover member for the valve housing in such manner that a simple ring-like bearing member may be utilized to journal the valve plug. Such bearing member is mounted in a counterbore surrounding the fluid passage through the cover and the exterior cylindrical surface of such annular bearing member cooperates with the valve plug to rotatably journal the plug within the operating chamber of the valve housing, while the bore of the annular bearing member defines a fluid passage communicating between the fluid passage in the cover member and the fluid passage in the valve plug.

Another feature of this invention is the provision of spring pressed detents operable between the rotatable valve plug and the valve housing. Such detents exert a unique multiple influence on the rotatable valve plug in that they urge the valve plug axially into engagement with the fixed bearing provided in the operating chamber of the valve housing and thus compensate for variations in dimensions or location of the bearing member mounted in the removable cover; secondly, the spring pressed detents cooperate with positioning depressions in the periphery of a cover member on the valve housing to resiliently position the rotatable valve plug in any selected one of a plurality of rotative positions in the housing, corresponding respectively to the positions of alignment of the fluid passage in the valve plug with each of the peripherally spaced ports in the valve housing.

Accordingly it is an object of this invention to provide an improved valve construction of the type wherein a valve plug is rotatable within a valve housing to effectuate fluid connections between several independent ports in the valve housing.

Another object of this invention is to provide an improved selector valve construction wherein the rotatable valve plug is journaled on an annular bearing member which is in turn supported on a cover removably secured to the valve housing.

Another object of this invention is to provide an improved fluid flow device wherein an annular bearing member may be utilized to journal a rotatable valve plug on its exterior surface and to define a fluid passage with its interior surface communicating with the fluid passage in the valve plug.

A further object of this invention is to provide an improved selector valve construction incorporating a rotatable valve plug wherein the valve plug is axially movable relative to the valve housing and is spring biased toward one extreme axial position by a spring pressed detent operating between the valve plug and a cover removably secured to the valve housing, thus compensating for variations in dimensions produced by manufacturing tolerances or wear.

A particular object of this invention is to provide an improved fluid flow device of the selector valve type embodying a valve plug rotatable in a valve housing to effect a plurality of fluid connections between selected ports in the housing, wherein a plurality of spring pressed detent means are utilized to perform the double function of axially positioning the rotatable valve plug in correct relation to the valve housing and to resiliently position the valve plug in any selected one of a plurality of rotative positions relative to the valve housing.

The specific nature of this invention as well as other objects and advantages thereof will be apparent to those skilled in the art from the following detailed description of the annexed sheet of drawings which, by way of preferred example only, illustrates one embodiment of the invention.

On the drawings:

Figure 1 is a vertical cross-sectional view, with parts in elevation, and with parts broken away, of a selector valve embodying this invention;

Figure 2 is a bottom elevational view of Figure 1 with the cover member and associated components removed; and Figure 3 is a top elevational view of the cover member of Figure 1.

As shown on the drawings:

As shown in Figure 1, the reference numeral 10 designates generally a selector valve having a housing or body 11 with a cylindrical bore 11a extending inwardly from the bottom face thereof to define a valve operating chamber 12. The bore 11a is counterbored at 11b to provide a smaller diameter recess 13 above the valve operating chamber 12. This recess 13 is topped by the top end wall 11c of the body 11. The end wall 11c is centrally apertured at 14. A graphitic carbon or other suitable composition bearing ring 15 is seated in the recess 13 in snug seating engagement with the wall of the counterbore 11b.

A cover 17 is removably secured to the bottom of housing 11 for closing the open end of the bore 11a. Bolts (not shown) secure the cover 17 to the body 11, passing through holes 17h in cover 17 and into tapped holes 11h in housing 11. The bore 11a is counterbored at 11d in the mouth thereof to provide a recess for an O-ring seal 18 to provide a sealing gasket for the cover 17. The cover 17 is a hollow member having a fluid passage bore 17c and a pilot portion 17a projecting into the bore 11a of the housing 11. This pilot portion 17a engages the O-ring 18 in sealing relation therewith and has a counterbored central portion 17b receiving a bearing ring 8 of the same composition as the ring 15 but of smaller diameter than the ring 15. The bearing ring 8 projects above the top pilot portion 17a of the cover 17 into the central portion of the chamber 12. The bore 17c of cover 17 is preferably the same diameter as the inside diameter of the bearing ring 8 and extending from the bearing ring 8 to a counterbored larger diameter, outer end portion 17d. The counterbore 17d, in turn, is further counterbored at 17e around the mouth thereof to provide a recess for an O-ring seal 19. A nipple 20 has a tubular end portion 20a extending into the counterbore 17d in sealing engagement with the O-ring 19. A flange 20b on the nipple overlies the end face of the body 17 and is also in sealing engagement with the O-ring 19.

A cap ring 21 is secured on the end face of the body by means of cap screws 22. The ring 21 has a bore 21a therethrough counterbored at 21b to receive the flange 20b of the nipple and provide a shoulder 21c overlying the flange 20b for securing the nipple in swivel relationship with the cap 17. The O-ring 19 will seal the nipple 20 to the cap 17 but will permit rotation of the nipple about its own axis relative to the cap.

A valve plug 23 is rotatably mounted in the operating chamber 12 of the casing 11 on the bearings 15 and 8. Thus the plug 23 has a cylindrical bearing recess 23a in its bottom face receiving the external surface of bearing ring 8 therein in bearing relation with the side wall of the recess. The top of the plug 23 has a circular flange 23b projecting into the bearing ring 15 in bearing engagement therewith.

The plug 23 is smaller than the bore 11a of the body 11 and the bearing rings 15 and 8 hold the plug in spaced relation from the bore wall to "float" the plug in the body. The peripheral wall of the plug thus will not become roughened or scratched by the body as it is rotated therein. The length of plug 23 is preferably such as to permit limited axial movement of the plug 23 when assembled in valve housing 11.

The plug 23 is provided with a plurality of peripherally spaced, axially parallel recesses 23k in each of which is respectively mounted a pin or detent P and a spring 23m. Spring 23m operates between the base of pin P and the bottom of the respective recess 23k. Thus a resilient bias is imparted to plug 23 tending to move it axially into the valve operating chamber 12 and into snug engagement with the fixed bearing ring 15. While any suitable number of such pins may be provided, as shown in Figure 2 three such pins P are preferably provided, two of which are diametrically spaced relative to each other and the third of which is located intermediate the other two. A plurality of peripherally spaced recesses or notches 17e are provided in the top surface of the cover 17 and respectively receive the projecting ends of the detents P to resiliently position the plug 23 in any selected one of a plurality of angularly spaced operating positions. The number and spacing of the recesses 17e preferably correspond to the location of the various ports 11e provided in the side walls of the valve housing 11. In the specific example illustrated in Figure 3, four such recesses 17e are provided, equally spaced about the periphery of cover 17.

A shank portion or stem 23c of the plug 23 projects through the aperture 14 in the top wall 11c of the body and receives a yoke member 24 thereon for driving attachment with a prime mover, such as an operating rod, a handle, or the like (not shown). An O-ring 25 surrounds the stem 23c in the recess 13 of the body member 11 and is bottomed by a washer 26. The washer 26 is spring-pressed by a spring 27 to urge the O-ring 25 against the top wall 11c of the body for sealing the stem 23c of the plug to prevent leakage through the aperture 14.

The body 11 has a plurality of peripherally spaced, radial bores 11e in the side walls thereof providing ports communicating with the operating chamber 12. The plug valve 23 has an L-shaped passageway 28 therein extending through the side wall thereof and through the recess 23a thereof for selectively connecting the ports provided by the bores 11e with the passageway through the bearing ring 8, bore 17c and nipple 20. It is therefore apparent that bearing ring 8 performs a double function, journaling the plug 23 on its external surface and defining a fluid passageway with its internal surface. It is also obvious that the detents P automatically properly position plug 23 in correct axial relation to the bearing rings 15 and 8 and thus takes up dimensional variations produced in manufacture of any of the related components.

The ports provided by the bores 11e are equipped with gasket-type seals disclosed in our parent application Serial No. 624,242. These seals include a rubber sleeve 30 with tubular portion 30a, sized for a snug sliding fit in the bore 11e, and an outturned flange 30b at one end thereof for overlying the side face of the body 11, to provide a gasket.

The inserted end of the tubular portion 30a has a metal ring 31 embedded therein. This metal ring 31 has a cylindrically concave or dished end face facing the free end face of the tubular portion 30a and is covered with the rubber of the tubular portion to provide an active sealing end face 30c which is resiliently deformable but which is rigidly backed by the end face of the metal ring 31. The ring 31 also has an inwardly projecting flange 31b extending into the tubular portion 30a of the rubber member to provide an abutment for a coil spring 32 which is compressed in the member 30 for urging the end face 30c thereof against the periphery of the plug 23.

The flange or gasket-defining portion 30b of the seal member 30 has an axially outwardly extending bead 30c around the periphery thereof. A mounting block 33 composed of metal, plastic, or other rigid material has a first end face confronting the side wall of the body 11 recessed at 33a to receive the flange portion 30b of the seal member 30 and having an annular deeper recessed portion or groove 33b receiving the bead 30c of the member 30. The mounting block 33 also has a rounded groove or recess 33c in the bottom of the recess 33a thereof positioned to receive that portion of the seal member 30 adjacent the junction between the tubular portion 30a and the flange 30b for accommodating outward movement of the tubular portion 30 in the event of expansion thereof or variations in tolerance limits. As shown in Figure 1, the mouths of the bores 11e are rounded to accommodate inward movement of the tubular portion 30a of the seal member 30 in the event of shrinkage of the member or variations in tolerance conditions. This arrangement provides a sliding seal which will always have its active end face 30c in sealing engagement with the periphery of the plug valve 23. The coil spring 32 is bottomed on the block 33 on the end face 33a thereof adjacent the inner diameter of the annular groove 33c.

The block 33 has a stepped bore 33e therethrough with the smallest bore portion extending outwardly from the recessed face 33a thereof. The bore 33e is counterbored at 33f and 33g to provide shouldered recesses. The recess provided by the counterbore 33f is larger than the recess provided by the bore 33e while the recess provided by the counterbore 33g is larger than the recess provided by the counterbore 33f. The counterbore 33g extends inwardly from the flat end face of the block 33 opposite the recessed end face 33a.

As described in our aforementioned parent application Serial No. 624,242, the block 33 has holes (not shown) therethrough in diametrically opposed positions adjacent the outer diameter of the groove 33b for receiving screws (not shown) to secure the block to the body 11. The block has the recessed end face thereof confronting a flat side wall of the body 11 and the screws inserted through such holes will clamp the block to the body in sealed relation with the gasket portion 30b of the seal member 30.

The block 33 also has holes (not shown) in the four corners thereof for a purpose to be hereinafter described.

An O-ring 34 is seated in the recess provided by the counterbore 33g of the block 33.

A nipple 35 has a tubular portion 35a thereof projecting into the counterbore 33f of the block in sealing relation with the O-ring 34. A flange 35b on the nipple overlies the face of the block around the counterbore 33g thereof and is also in sealing engagement with the O-ring 34. It will be understood that the nipple 35 is connected to a suitable hose, tube, or the like.

A cap ring 36 having a bore 36a therethrough freely receiving the tubular portion of the nipple 35 is slipped over this portion. The bore 36a is counterbored at 36b to receive the flange 35a of the nipple and to provide a shoulder 36c overlying the flange 35b around the periphery thereof. Cap screws 37 are passed through suitable holes in the cap ring 36 through the holes (not shown) of the block 33 and are threaded into tapped holes (not shown) in the body 11 to secure the cap ring to the block and body. The nipple 35 can rotate about its own axis in the cap ring 36 and the O-ring 34 will not interfere with this rotation but it will at all times sealingly connect the interior of the nipple with the port provided by the bore 11e of the body 11 and mounting block 33 so that the nipple 35 can be replaced with other appurtenances for the valve 10, such as a closure plug 38 shown in the left hand port in Figure 1. This plug 38 has a pilot portion 38a projecting into the counterbore 33f of the mounting block 33. This pilot portion 38a is of the same diameter as the tubular portion 35a of the nipple 35. A flange 38b is provided on the closure plug 38 similar to the flange 35b on the nipple 35 so that the nipple and closure plug are interchangeable. The closure plug 38 is useful for sealing one of the ports provided by the bores 11e of the valve body 11.

Fluid can flow from a nipple 35 through a selected port provided by a bore 11e of the body, through the passageway 28 in the valve plug 23, through bearing 8, through bore 17c of cover 17, and hence into the nipple 20.

The nipples 20 and 35 can each rotate about their own axes, can be replaced with other appurtenances for the valve, and during such replacement operation the port seal and other operating parts of the valve are not touched. The swivel movement of the nipples and other appurtenances will not produce leakage because the O-ring seals for the nipples and other appurtenances accommodate swivel movement without loss of efficiency.

The valve plug will be readily rotatable within the housing and resiliently positioned by detents P in each of its operating positions. Due to the "floating" mounting of the valve plug it will not be clamped against rotation even though cover 17 is excessively tightened onto the housing.

It will, of course, be understood that various details of construction may be varied through a wide range without departing from the principles of this invention and it is, therefore, not the purpose to limit the patent granted hereon otherwise than necessitated by the scope of the appended claim.

We claim as our invention:

In a fluid flow control device of the type having a housing defining an operating chamber open at one end with a valve plug insertable in said chamber, the improvement of a first ring bearing in said chamber spaced from said open end for supporting said valve plug for rotation within said chamber, said valve plug having a fluid passage therethrough opening adjacent said open end of said chamber, a cylindrical bearing surface formed in the open end of said fluid passage in said valve plug, a hollow cover defining a counterbored fluid passage and secured to said housing across said open end of said chamber, a second ring bearing mounted in the counterbore of said cover in concentric relation to the bore thereof, said second ring bearing projecting upwardly from the cover and having a portion of its external surface engageable with said cylindrical bearing surface of the valve plug, said second ring bearing and said first ring bearing being axially spaced apart for supporting said valve plug for rotation within said chamber, said valve plug being axially movable within said chamber between said first and said second ring bearing, the internal surface of said second ring bearing completing the fluid passage between said bore of said cover and said fluid passage of said valve plug, spring pressed detent means in said valve plug and engaging said cover to urge said valve plug axially toward said first ring bearing, and angularly spaced recesses in said cover engageable with said detent means to resiliently position said valve body in any selected one of a plurality of rotative positions relative to said housing.

JACOB RUSH SNYDER.
JAMES FREDERICK NORTON.

REFERENCES CITED

The following references are of record in the file of this patent:

UNITED STATES PATENTS

| Number | Name | Date |
|---|---|---|
| 1,532,251 | Lorraine | Apr. 7, 1925 |
| 1,777,324 | Mock | Oct. 7, 1930 |
| 2,138,530 | Wagner | Nov. 29, 1938 |
| 2,262,703 | Stuckenholt | Nov. 11, 1941 |
| 2,314,512 | Parker | Mar. 23, 1943 |
| 2,342,770 | Temple | Feb. 29, 1944 |
| 2,383,983 | Melichar | Sept. 4, 1945 |
| 2,506,534 | Wolcott | May 2, 1950 |

FOREIGN PATENTS

| Number | Country | Date |
|---|---|---|
| 2,763 | Great Britain | of 1916 |